L. HORINKO.
ANIMAL TRAP.
APPLICATION FILED MAY 16, 1908.

903,091.

Patented Nov. 3, 1908.
2 SHEETS—SHEET 2.

WITNESSES
Edward Thorpe

INVENTOR
Leonard Horinko
BY
ATTORNEYS

UNITED STATES PATENT OFFICE.

LEONARD HORINKO, OF NEW YORK, N. Y.

ANIMAL-TRAP.

No. 903,091.

Specification of Letters Patent.

Patented Nov. 3, 1908.

Application filed May 16, 1908. Serial No. 433,221.

*To all whom it may concern:*

Be it known that I, LEONARD HORINKO, a subject of the Czar of Russia, and a resident of the city of New York, borough of Manhattan, in the county and State of New York, have invented a new and Improved Animal-Trap, of which the following is a full, clear, and exact description.

This invention is an improvement in animal traps, and has for its purpose to provide such a device for catching small animals, such as mice, rats, etc., which embodies in its construction a cage, an auxiliary cage open at both ends and having means adapted to hold the bait, and a trap door in the top of the cage, forming the bottom of the auxiliary cage.

Reference is to be had to the accompanying drawings forming a part of this specification, in which similar characters of reference indicate corresponding parts in all the views.

Figure 1:
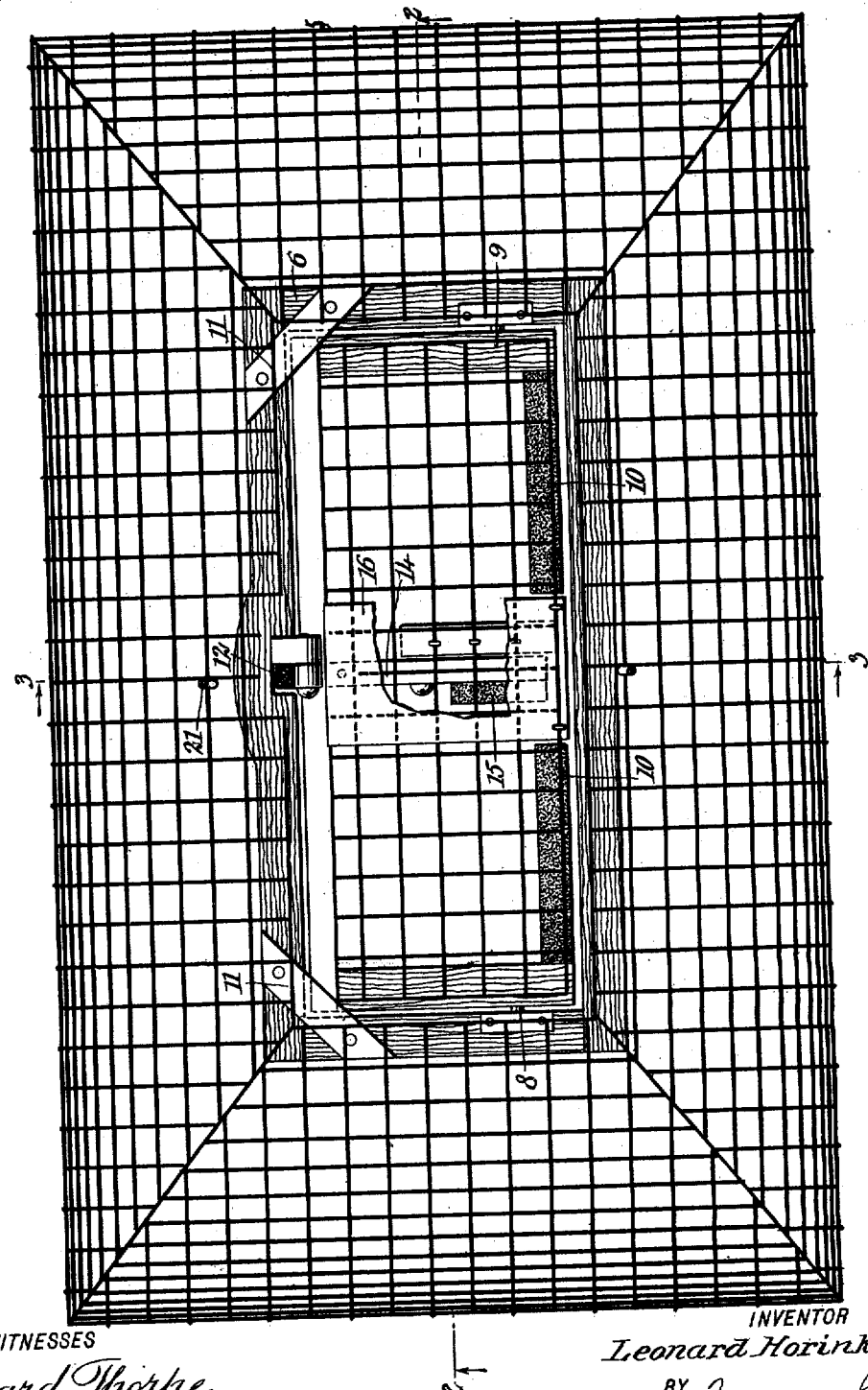
Figure 2:
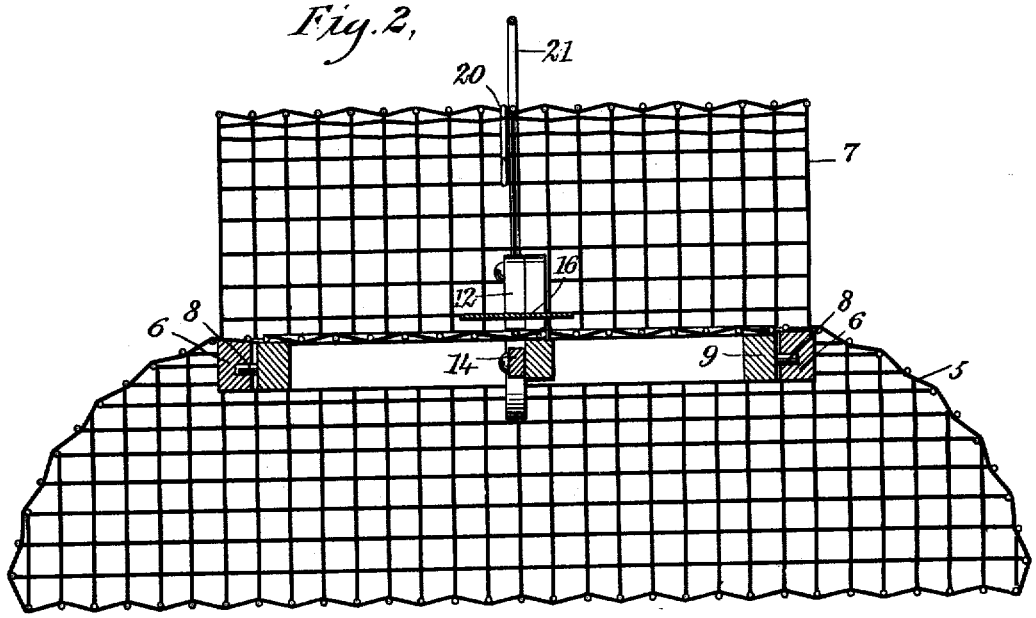
Figure 3:
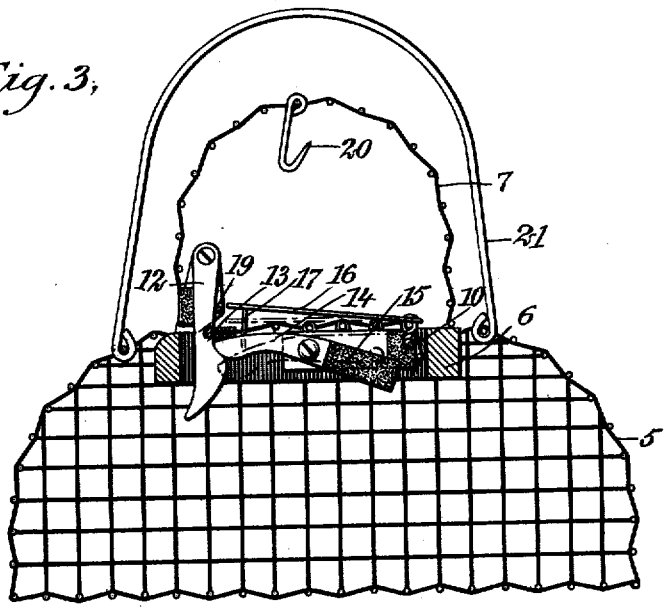
Figure 4:
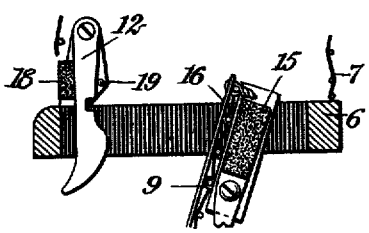

Figure 1 is a plan of a trap embodying my invention; Fig. 2 is a section substantially on the line 2—2 of Fig. 1; Fig. 3 is a section on the line 3—3 of Fig. 1; and Fig. 4 is a fragmentary view of the trap door when in open or dumping position.

In the construction of the trap I make use of a cage 5 of any suitable size or shape, preferably of reticulated material. The top of the cage approximately at the center has an open frame 6 attached thereto which is covered over by what I term an auxiliary cage 7, also of reticulated material. Within the frame 6 is pivotally supported on trunnions 8, near one side, a trap door 9 which is covered with the same material of which the cages are made, and is provided at that side adjacent to the trunnions 8 with one or more weights 10 operating to force the opposite side of the door upwardly in contact with corner plates 11, or other suitable stops, in connection with the frame 6, in which position the top of the door lies in approximately the same plane as the top of the main or principal cage 5.

At that side of the door furthest removed from the trunnions 8, and substantially on the transverse center of the trap, is a pivotally suspended catch 12 having a notch in its front edge for engaging with the frame of the door and locking it in approximately horizontal position. The catch is further provided with a rounding or cam recess 13 in which the correspondingly-shaped end of a lever 14 is adapted to engage, the other end of said lever at the opposite side of its fulcrum being provided with a weight 15 operating to hold it against the dropping edge of the door. At or near the center and at the outside of the door is a plate 16 hinged thereto adjacent to the weights 10 and having a pin or other projection 17 bearing on the top of the unweighted arm of the lever 14, the pin being of such length as to hold the plate slightly above the door when the latter is locked, as illustrated in Fig. 3.

It will be best observed from Fig. 1 that the pivoted catch 12 hangs within a notch formed in the frame 6, the notch being of such extent as to permit of the catch swinging a substantial distance outwardly, the quick return of the catch to a locking position being insured by attaching thereto a weight 18, at the outside, which forces the catch inwardly against a stop pin 19. From the center of the auxiliary cage is suspended the customary bait holder 20, and a bail or handle 21 is attached to the main or principal cage 5, at the outside of the auxiliary cage, by which the trap is carried about.

In the operation of the trap the bait is applied to the holder 20, which the animal has no hesitancy in going for in view of the fact that both ends of the auxiliary trap are open. As the animal cautiously steps on the trap door, which forms the bottom of the auxiliary cage, he will find it to afford a firm footing. When, however, the weight of the animal is placed on the plate 16, it will, through the action of the lever 14, throw out the catch 12 from the door, thereby releasing the latter and precipitating the animal within the main or principal cage. As the animal drops from the trap door, the latter, together with the lever and catch, will, through the action of its respective weights, instantaneously return to the locking position illustrated in Fig. 3, and thus automatically re-set the trap.

Having thus described my invention, I claim as new and desire to secure by Letters Patent:

1. The combination of a cage having an open frame in the top thereof, an auxiliary cage open at both ends and covering the said frame, a door pivotally supported in the frame, a stop in connection with the frame, a weight attached to the door at the side adjacent to its pivots, tending to force the door against the stop, a weighted catch pivotally suspended at the unweighted side of the door, having a notch for engaging and locking the latter in a closed position and provided with a cam recess, a lever fulcrumed on the door having a weight applied to one of its arms, normally forcing the other arm toward the door and engaging it in said cam recess, and a plate pivoted to the door adjacent to the weighted side thereof, having a projection at its opposite side bearing on the unweighted arm of the lever.

2. The combination of a cage having an opening in the top thereof, a trap door pivotally supported in said opening, means normally tending to return the door to a closed position, a depending swinging catch having means for engaging and locking the door, a lever fulcrumed on the door having one end in engagement with the catch when the door is closed, and a depressible member arranged at the outside of the door having means adapted to seat on the lever intermediate its engaged end and fulcrum.

3. The combination of a cage having an opening in its top, a trap door pivotally supported within said opening, a pivotally suspended catch for locking the door in a closed position, a lever fulcrumed intermediate its length adapted to directly engage with the catch, and depressible means arranged at the outside of the door for moving the lever in a direction to swing the catch from the door.

4. The combination of a cage having an opening in the top thereof, a trap door fulcrumed within said opening having a weighted edge tending to move it to a closed position, a depending swinging catch having means for engaging the opposite edge of the door and locking it when closed, a lever fulcrumed on the door having one of its ends weighted and adapted to engage the catch at the opposite end when the door is closed, and a depressible plate having a foot resting on the engaged end of the lever.

In testimony whereof I have signed my name to this specification in the presence of two subscribing witnesses.

LEONARD HORINKO.

Witnesses:
W. W. HOLT,
JOHN P. DAVIS.